United States Patent [19]
Hashimoto et al.

[11] 4,320,971
[45] Mar. 23, 1982

[54] SPECTROPHOTOMETER

[75] Inventors: Noriyoshi Hashimoto, Chofu; Mikio Ito; Kikuo Tamura, both of Yokohama, all of Japan

[73] Assignee: Nippon Kogaku K.K., Tokyo, Japan

[21] Appl. No.: 70,103

[22] Filed: Aug. 27, 1979

[30] Foreign Application Priority Data

Aug. 28, 1978 [JP] Japan ................ 53-103785
Aug. 28, 1978 [JP] Japan ................ 53-103788

[51] Int. Cl.$^3$ .......................... G01J 3/18; G01J 3/38
[52] U.S. Cl. .................................... 356/328; 356/334
[58] Field of Search ............. 364/498, 526; 356/308, 356/309, 319, 320, 323–326, 328, 332, 334

[56] References Cited

U.S. PATENT DOCUMENTS

| | | |
|---|---|---|
| 3,433,557 | 3/1969 | McPherson . |
| 3,520,614 | 7/1970 | Goldstein . |
| 3,695,764 | 10/1972 | Delmas et al. ................ 356/334 X |
| 3,868,499 | 2/1975 | Aaronson et al. ............. 356/326 X |
| 3,874,799 | 4/1975 | Isaacs et al. ................... 356/323 X |
| 4,211,486 | 7/1980 | Magnussen, Jr. .............. 356/328 |

OTHER PUBLICATIONS

Horlick, *Applied Spectroscopy*, vol. 30, No. 2, Mar./Apr. 1976, pp. 113–123.
Betty et al., *Applied Spectroscopy*, vol. 32, No. 1, Jan.-/Feb. 1978, pp. 31–36.

*Primary Examiner*—F. L. Evans
*Attorney, Agent, or Firm*—Shapiro and Shapiro

[57] ABSTRACT

A spectrophotometer has an image sensor capable of electrically scanning, such as a photo-diode array, as a photoelectrical converting element. A photoelectrical conversion signal is obtained corresponding to an arbitrarily selected wavelength from the signal time-sequentially produced from a one-dimensional image sensor by means of such a simple structure.

10 Claims, 25 Drawing Figures

SPECTROPHOTOMETER

BACKGROUND OF THE INVENTION

1. Field of the Invention

The present invention relates to a spectrophotometer.

2. Description of the Prior Art

There are already known spectrophotometers in which, for photoelectrical detection of light of a desired wavelength from diffracted light, mechanical scanning is performed with a diffracting element or a photoelectrical converting element, thus achieving spectral measurement by the corresponding between the spatial position of said element and the wavelength.

However, such mechanical scanning with the diffracting element or a photoelectrical converting element is not satisfactory in consideration of the scanning speed or the reliability.

SUMMARY OF THE INVENTION

An object of the present invention, therefore, is to provide a spectrophotometer with improved measuring speed and reliability.

Particularly, an object of the present invention is to provide a spectrophotometer utilizing, as the photoelectrical converting element, an image sensor capable of electrically scanning, such as a photo-diode array, thus enabling the attainment of a photoelectrically converted signal corresponding to a desired wavelength with a simple structure.

DESCRIPTION OF THE PREFERRED EMBODIMENTS

The present invention will be explained in detail by the following description of the embodiments thereof shown in the attached drawings.

Figure 1:
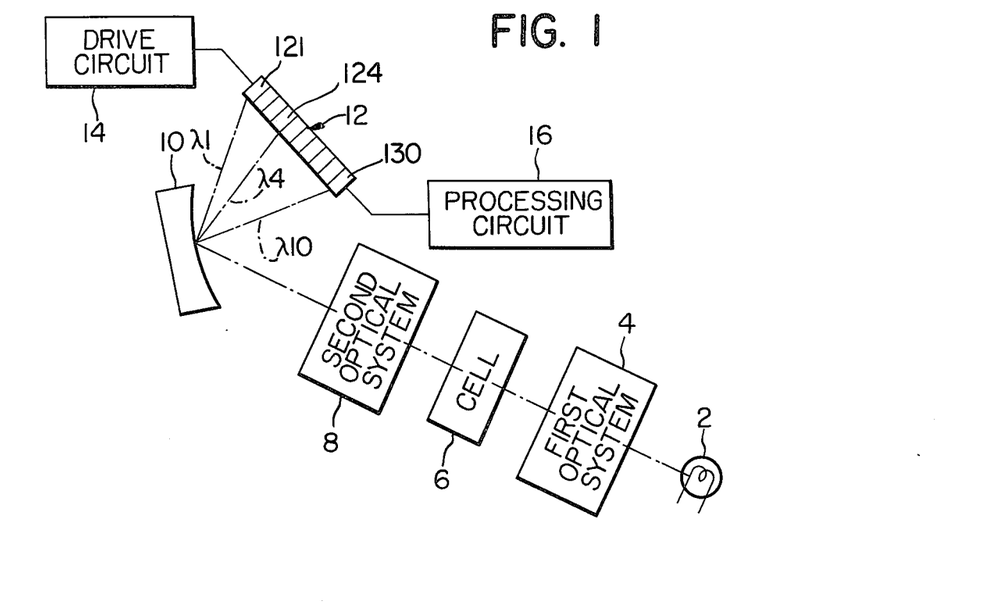
FIG. 1 is a schematic view of an optical arrangement of the spectrophotometer embodying the present invention.

In FIG. 1 schematically shows an embodiment of an optical system which may be employed in the spectrophotometer of the present invention. A light beam emitted by a light source 2 is collimated by a first optical system 4, then passes through a sample in a cell 6 and a second optical system 8, is diffracted by a diffracting element 10 such as a concave diffraction grating and focused on a one-dimensional image sensor 12. In this arrangement the beam of a particular wavelength diffracted by the diffracting element 10 is always focused to a particular position on said one-dimensional image sensor 12. For example, the photoelectric converting elements 121, 124 and 130 respectively correspond to wavelengths $\lambda 1$, $\lambda 4$ and $\lambda 10$. Said one-dimensional image sensor 12 is composed of a semiconductor photoelectrical converting element such as a MOS photodiode array and is structured to provide photoelectrically converted signals time sequentially from the photoelectric converting elements at one end 121 to the other end 130 in synchronization with clock pulses supplied from a drive circuit 14. The output signals from said one-dimensional image sensor 12 are sequentially received by a processing circuit 16 and suitably treated therein.

Figure 2:
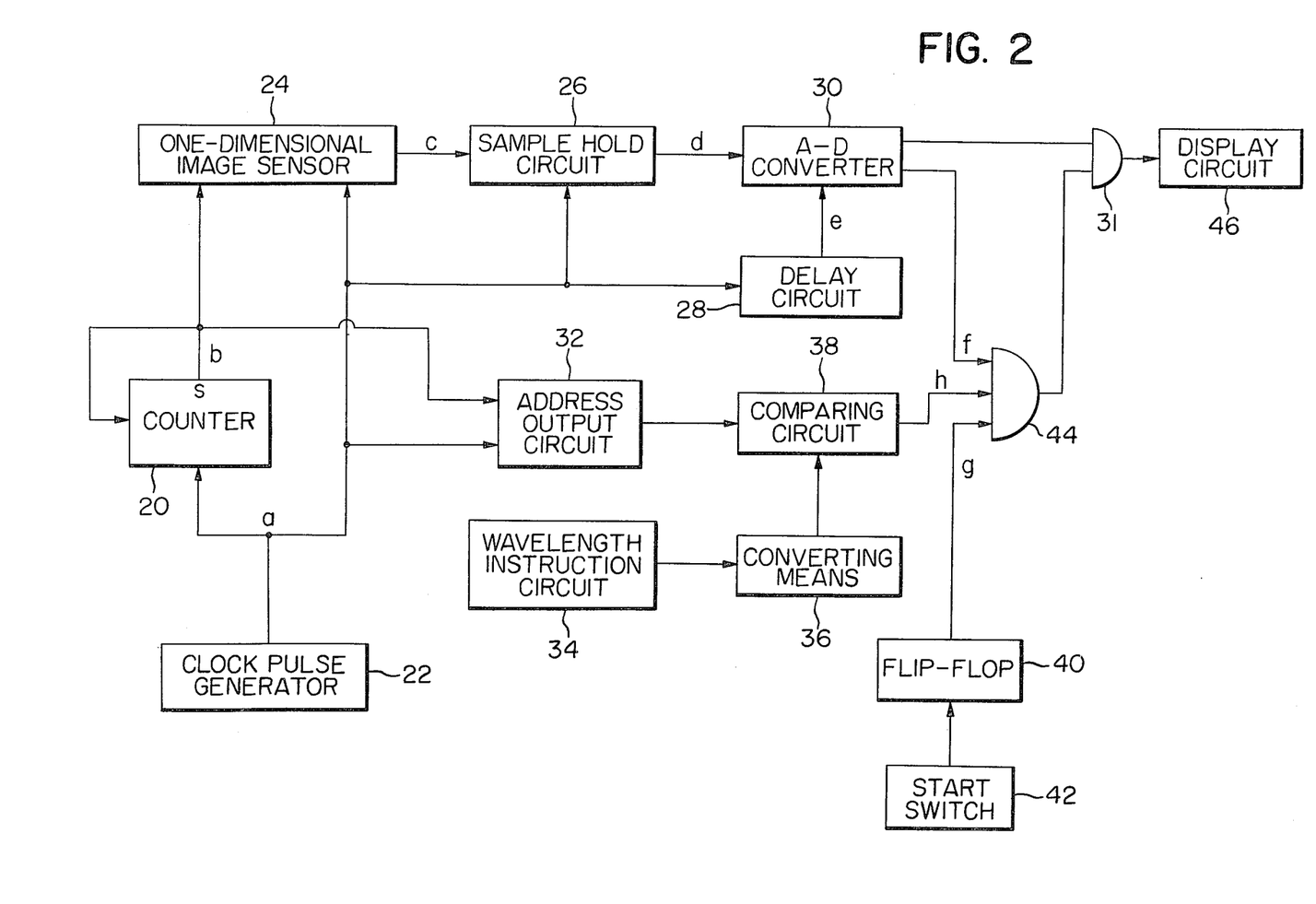
FIG. 2 is a block diagram showing an electrical processing system of the spectrophotometer embodying the present invention.

In a first embodiment of the present invention shown in FIG. 2, a counter 20 counts the clock pulses supplied by a clock pulse generator 22 and, upon receipt of a determined number, produces a carry signal from an output terminal S, said carry signal being utilized as the preset pulse for said counter 20. A one-dimensional image sensor 24 performs a scanning function as a result of the clock pulses from said clock pulse generator 22 supplied after the production of said carry signal from the counter 20. In this manner, the one-dimensional image sensor 24 produces time sequential photoelectrical conversion signals in synchronization with the clock pulses, which correspond to the amounts of light received by the photoelectric converting elements.

A sample-hold circuit 26 is adapted to perform sample holding on the photoelectric conversion signals generated from the image sensor 24 in synchronization with the clock pulses from the clock pulses generator 22, and has a signal processing time satisfactorily shorter than one frequency of said clock pulses. A delay circuit 28 delays the clock pulses from the clock pulse generator 22 in such a manner that the output signals from said sample-hold circuit 26 are subjected, after stabilization thereof, to analog to digital conversion in an analog-digital converting circuit 30. Thus, said analog-digital converting circuit 30 produces A/D conversion signals by analog to digital conversion of the output signals from the sample-hold circuit 26 in synchronization with the clock pulses delayed by the delay circuit 28, and generates a conversion completion signal upon completion of said conversion. Such analog-digital converting circuit is commercially available as a monolithic element and is provided with a signal processing time sufficiently shorter than the interval between the clock pulses.

An address output circuit 32 is composed of a counter for counting the clock pulses received from the clock pulse generator 22 after the production of the carry signal from the counter 20, and generates a counted number corresponding to the currently driven address of the one-dimensional image sensor 24. A wavelength instruction switch circuit 34 is composed of digital switches, snap switches, etc., so as to allow the user to select an arbitrary wavelength. A converting means 36 converts the output of said wavelength instruction switch circuit 34 into a value corresponding to the address of a photoelectric converting element so as to allow the comparison of the output of said switch circuit 34 with that of the address output circuit 32 in a comparing circuit 38. Since light of a particular wavelength is always received by a particular photoelectric converting element on the one-dimensional image sensor 24, said converting means 36 can be easily composed, for example, of a ROM (a read-only memory) making correspondence between the addresses of the converting elements and the wavelengths. The comparing circuit 38 receives the output from the address output circuit 32 and the output from the converting means 36, and produces a coincidence signal when both of the outputs coincide.

A flip-flop 40 is set by turning-on a start switch 42 to generate a set signal. An AND gate 44 is opened upon simultaneous receipt of the conversion completion signal from the analog-digital converting circuit 30, the coincidence signal from the comparing circuit 38 and the set signal from said flip-flop 40 to produce a logic "1" signal, thus opening another AND gate 31. In this manner the A/D conversion signal from the analog-digital converting circuit 30 is supplied, in synchronization with said logic "1" signal from the AND gate 44, to a processing and display circuit 46, converted therein into a suitable form, such as absorbance, and displayed thereon.

Figure 3A:
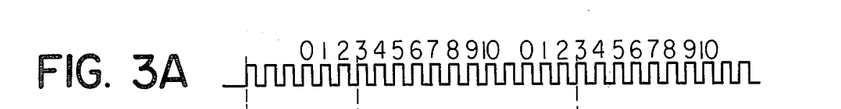
FIGS. 3A–3I show the signal waveforms in the system shown in FIG. 2.
Figure 3B:
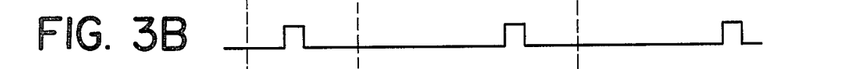
Figure 3C:
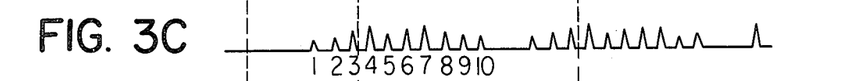
Figures 3D, 3E:
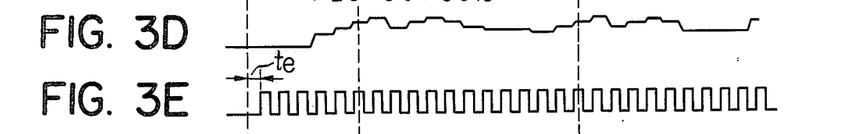
Figure 3F:
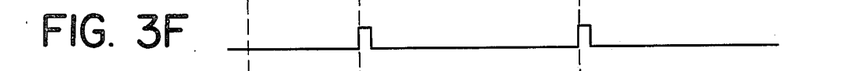

Now the function of the circuit shown in FIG. 2 will be explained in the following, while making reference to FIGS. 3A-3I showing the signal waveforms at portions (a)-(h) in FIG. 2. Upon closure of the start switch 42 at time $t_0$, the cell 6 (FIG. 1) is filled with a reference material (liquid or gas) of a standard absorption or reflection by means of an unshown mechanism. The clock pulse generator 22 generates the clock pulses as shown in FIG. 3A, and the counter 20 produces the carry signals as shown in FIG. 3B at every twelve clock pulses. The one-dimensional image sensor 24 performs a scanning function as a result of the clock pulses supplied after each carry signal, and generates the photoelectric conversion signals as shown by FIG. 3C. Each photoelectric converting element produces, in synchronization with the clock pulses, an electrical signal corresponding to the amount of light it receives between the receipt of one clock pulse and the receipt of a succeeding clock pulse. As will be apparent from FIG. 3C, the one-dimensional image sensor 24 employed in the present embodiment may be composed of ten photoelectric converting elements. The sample-hold circuit 26 generates the signal shown in FIG. 3D obtained by sampling and holding the photoelectric conversion signals of FIG. 3C. The analog-digital converting circuit 30 performs an analog to digital conversion on the sample-hold signal in synchronization with the clock pulses of FIG. 3E, delayed by time $t_e$ from those of FIG. 3A by the delay circuit 28, and produces the conversion completion signal as shown in FIG. 3F simultaneously with the completion of the conversion. In FIG. 3F, for the purpose of simplicity there is only shown the conversion completion signal corresponding to the analog-digital conversion signal of the 3rd photoelectric conversion signal in FIG. 3C.

Figure 3G:
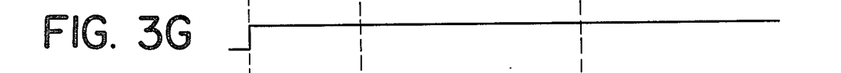
Figure 3H:
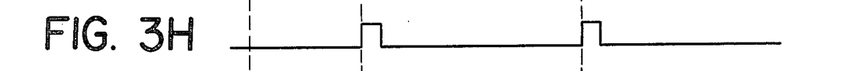
Figure 3I:
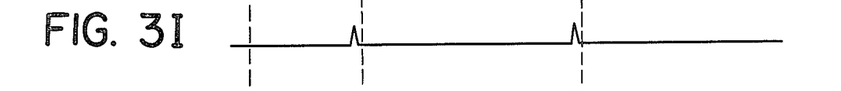

FIG. 3G shows the output of the flip-flop 40 which remains in the set state after closure of the start switch 42 at time $t_0$. In such state, a wavelength λ1, corresponding to an address 3, is selected by the snap switch circuit 34. The unique correspondence between the wavelength and the address of the photoelectric converting elements can be obtained by well-known write procedures after the apparatus is completed. Upon selection of the wavelength λ1, the converting circuit means 36 generates an output, for example "3". At the same time, the counted value of the address output circuit 32 counting the clock pulses after the production of the carry signal changes as represented by the numbers indicated on the upper part of FIG. 3A. When said circuit 32 counts a number "3", the comparing circuit 38 produces a coincidence signal as shown in FIG. 3H, whereby the AND gate 44 generates the logic "1" signal at time $t_1$ to introduce the digital signal corresponding to the photoelectric conversion signal (FIG. 3F) from the photoelectric converting element at the address "3" into the processing circuit 46. Upon completion of one scan of the one-dimensional image sensor 24, the counter constituting the address output circuit 32 is cleared by the carry signal and restarts the counting, whereby the above-explained procedure is repeated. In this manner the light absorbance, light transmission or light reflection of the reference material is displayed on the processing circuit 46.

After mesurement on the reference material is achieved in this manner, a sample to be measured is placed in the cell 6 and is subjected to the above-explained procedure, whereby the light transmission or reflection of said sample is obtained on the processing circuit 46. As a fully automatic apparatus it is also possible to store the values of transmission or reflection of the reference material and the sample respectively in separate memory circuits in the processing circuit 46 and to display the value of absorbance as the ratio of the stored values obtained in a dividing circuit, as to be explained later in connection with FIG. 8.

Figure 4:
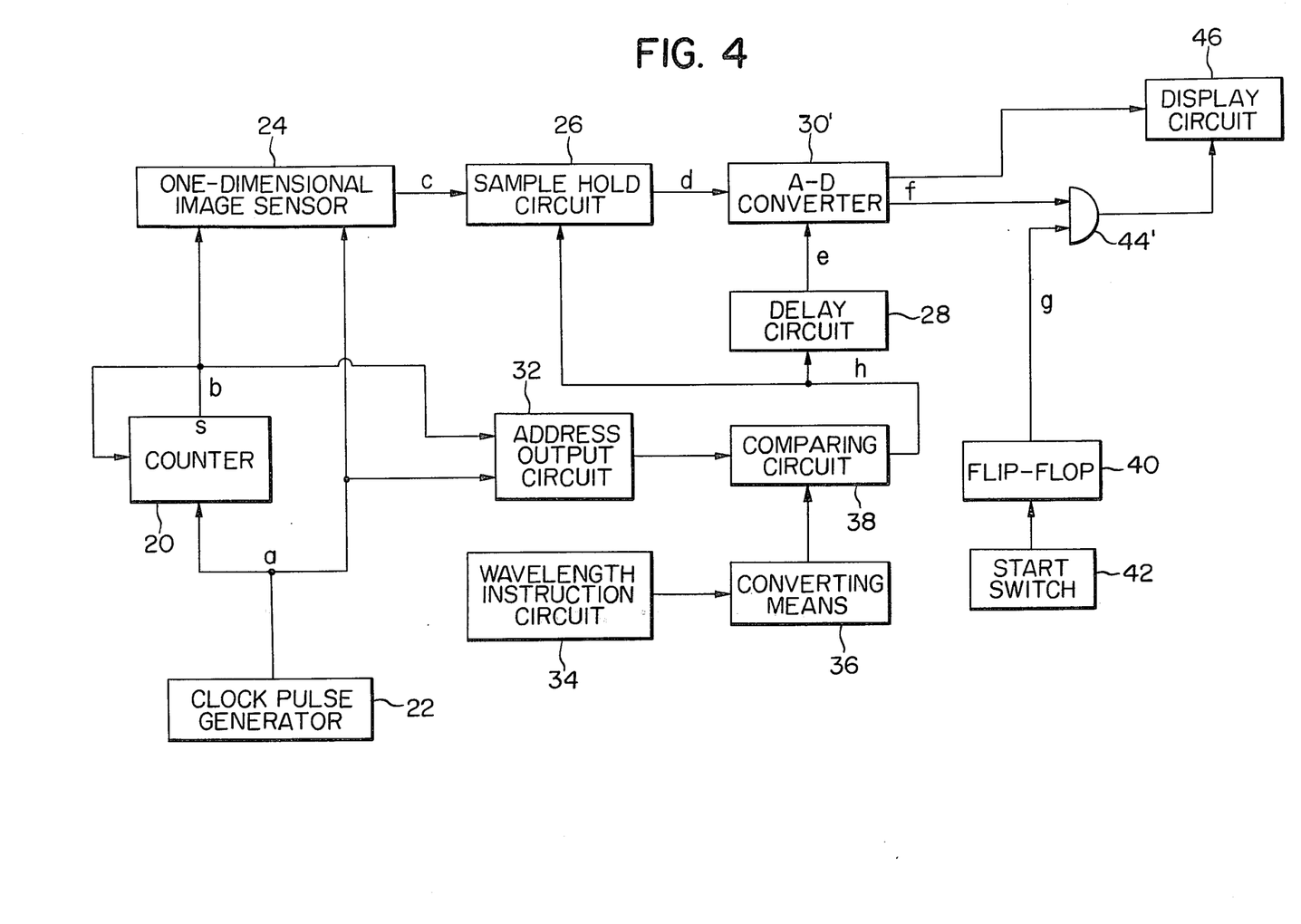
FIG. 4 is a block diagram showing another embodiment of the electrical processing system.
Figure 5A:
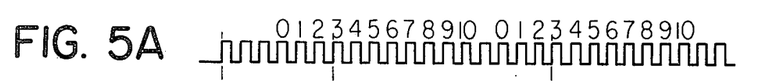
FIGS. 5A–5I show the signal waveforms in the system shown in FIG. 4.
Figure 5B:
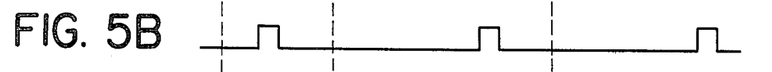
Figure 5C:
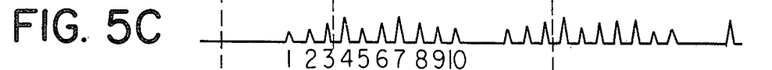
Figure 5D:
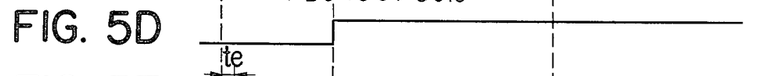
Figure 5E:
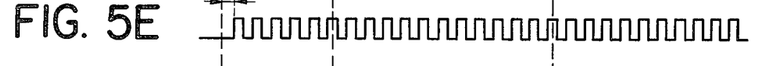
Figure 5F:
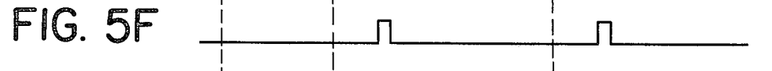
Figure 5G:
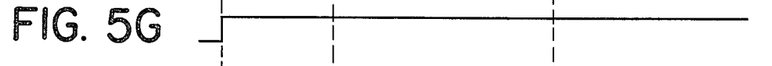
Figure 5H:
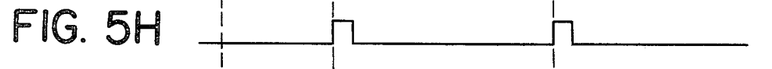
Figure 5I:
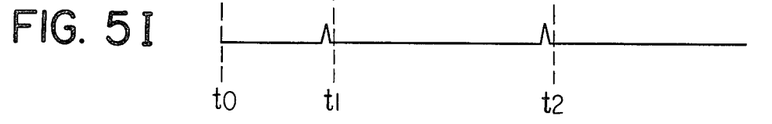

Although the analog-digital converting circuit 30 employed in the circuit of FIG. 2 has a processing time sufficiently shorter than the interval between clock pulses, such high-speed analog-digital converting circuit 30 is generally expensive. In FIG. 4, therefore, another embodiment of a circuit employing a low-speed analog-digital converting circuit 30' having a relatively long processing time is shown, wherein the circuit blocks other than said circuit 30' and the AND gate 44' may be constructed in the same manner as those in FIG. 2. The circuit of FIG. 4 differs from that of FIG. 2 mainly in that the synchronization of the sample-hold circuit 26 and the analog-digital converting circuit 30' is achieved by the coincidence signal from the comparing circuit 38. Consequently, the sample holding and the analog to digital conversion are not conducted for all the photoelectric conversion signals as shown in FIG. 2, but only for the photoelectric conversion signal corresponding to the selected wavelength. For this reason the processing time of the analog-digital converting circuit 30' need not be shorter than the interval between clock pulses, but only needs to be shorter than the duration of twelve clock pulses, in the case of FIG. 3. The AND gate 44' produces the logic "1" signal in response to the conversion completion signal from said analog-digital converting circuit 30' and to the set signal from the flip-flop 40, whereby the processing circuit 46 receives the analog-digital conversion signal in synchronization with said logic "1" signal. Other functions of the circuit are conducted in the same manner as explained in connection with FIG. 2.

FIGS. 5A-5I constitute a time chart showing the signal waveforms in various parts of the circuit shown in FIG. 4, wherein the symbols in the chart respectively correspond to those in the circuit of FIG. 4. It will be observed that the signals (d) and (f) in FIG. 5 differ from those in FIG. 3.

Figures 6, 9:
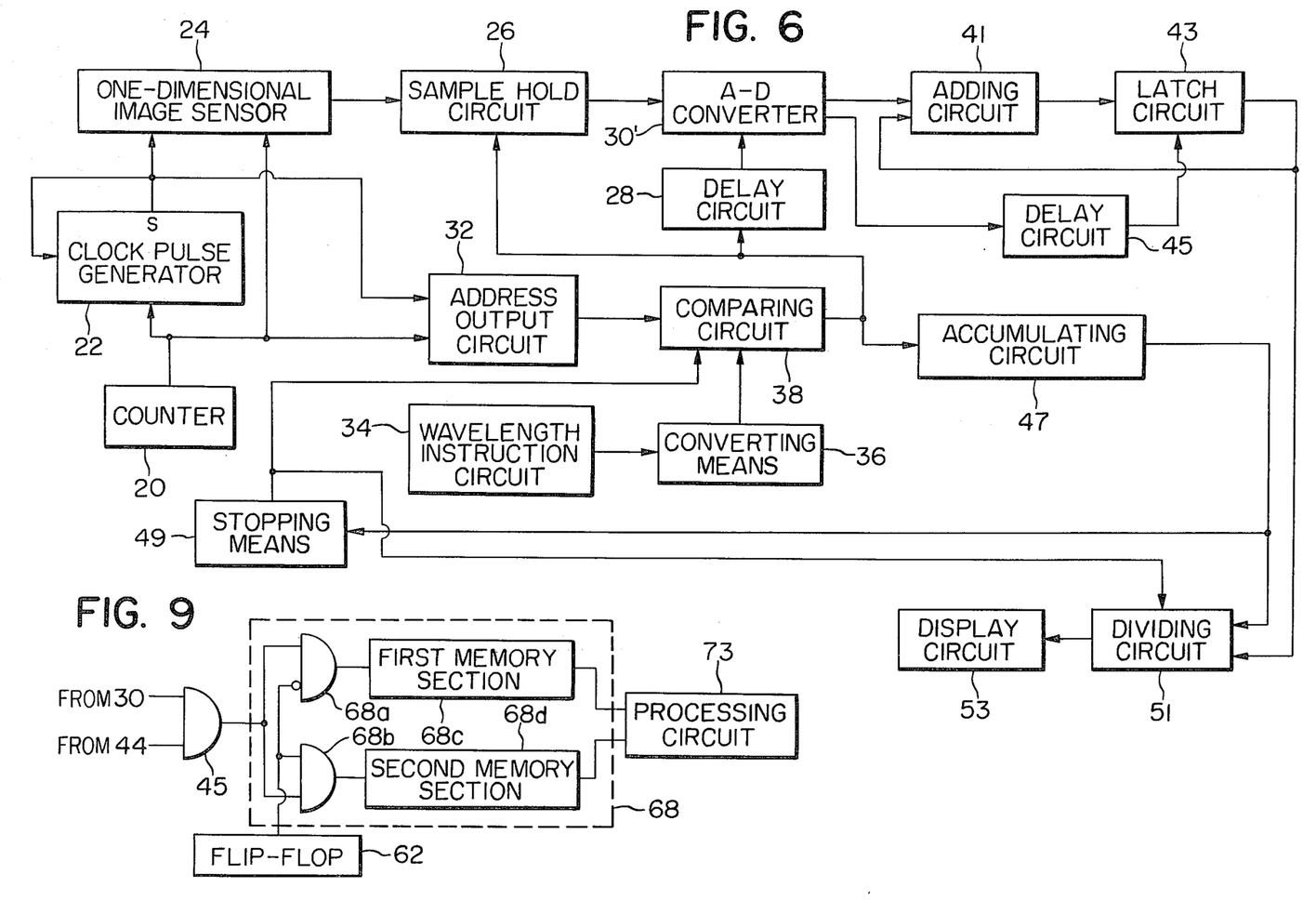
FIG. 6 is a block diagram showing a modification of the system shown in FIG. 4 so as to obtain an average response value.
FIG. 9 is a block diagram showing the details of the read-write memory in FIG. 8.

Although in the foregoing embodiments shown in FIGS. 2 and 4, the processing circuit 46 receives only one datum, it is possible to improve the reliability of measurement by scanning the one-dimensional image sensor n times and averaging the thus obtained n data in the processing circuit 46. FIG. 6 shows another embodiment comprising such an averaging circuit, wherein blocks which are the same as those in FIG. 4 are numbered the same and are omitted from the following explanation.

An adding circuit 41 adds the analog-digital conversion signal from the analog-digital converting circuit 30' and the output signal from a latch circuit 43 receiving the output signal from said adding circuit 41. A delay circuit 45 supplies the conversion completion signal from said analog-digital converting circuit 30' to the latch circuit 43 with a time delay. The latch circuit 43 latches the output signal of the adding circuit 41 upon receipt of said delayed signal. An accumulating counter circuit 47 counts the coincidence signals from the comparing circuit 38 and produces an accumulation completion signal upon counting a prdetermined number, e.g., n, of said coincidence signals. A stopping means 49 is composed of a flip-flop which is set upon receipt of said accumulation completion signal to disable the function of said comparing circuit 38 and to enable the function of a dividing circuit 51, which stores said prdetermined number as a divisor. The dividing circuit divides the contents of said latch circuit 43 by said divisor upon receipt of said accumulation completion signal and produces the quotient (average response value) as an output signal, which is displayed in a suitable form by a display circuit 53.

The function of the circuit shown in FIG. 6 will be explained in the following. Upon closing of an unshown main switch, the latch circuit 43 and the counter 47 are cleared while the stopping means 49 is reset, and the one-dimensional image sensor 24 performs a scanning operation by means of the clock pulses supplied by the clock pulse generator 20. Upon selection of a wavelength by the instruction switch circuit 34, the comparing circuit 38 generates a coincidence signal when the address output circuit 32 produces the address of the photoelectric converting element corresponding to said selected wavelength. In response to said coincidence signal the corresponding photoelectric conversion signal is retained in the sample-hold circuit and then is subjected to analog to digital conversion. Also in response to said coincidence signal, the content of the counter 47 becomes "1". The above-mentioned analog-digital conversion signal is added in the adding circuit 41 with the content "0" of the latch circuit 43 and the results stored therein. In response to the new coincidence signal from the comparing circuit 38 after producing the carry signal from the counter 22, the content of counter 47 is changed to "2", and the adding circuit 41 adds the analog-digital conversion signal generated from the analog-digital converting circuit 30' with the analog-digital conversion signal stored previously in the latch circuit 43, whereupon the obtained result is stored anew in said latch circuit 43. In this manner the latch circuit 43 stores the cumulative value of the photoelectric conversion signal corresponding to the wavelength selected by the switch circuit 34 obtained in each scan of the photoelectric converting element, while the counter 47 counts the coincidence signal generated at each scan. Upon counting a predetermined number of coincidence signals, the counter 47 produces the accumulation completion signal to disable the comparing circuit 38, whereby the coincidence signal is no longer generated and the latch circuit 43 maintains the stored content thereof, which is then divided in the dividing circuit 51. In this manner the dividing circuit 51 produces the averaged output of the photoelectric converting element corresponding to the wavelength selected by said switch circuit 34.

The dividing circuit 51 may have various structures but can be simplified by selecting the number of additions equal to m power of 2 (m:natural number), since the division can be achieved by simple digit shifting.

It is also possible to provide the processing (display) circuit 53 with two memory circuits which are respectively allotted to two wavelengths $\lambda 1$ and $\lambda 2$. In this manner it is rendered possible to store the averaged values for said two wavelengths respectively in said two memory circuits, and thus to obtain highly reliable data by measurements at two wavelengths by suitably processing the stored data.

Figure 7:
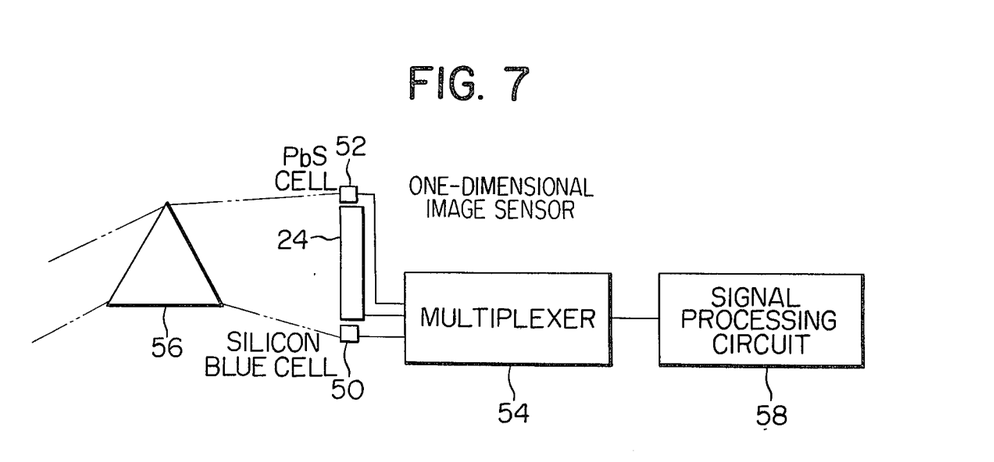
FIG. 7 is a schematic view of an optical arrangement for covering a wider spectral range.

The above-explained one-dimensional image sensor has a satisfactory response in the visible wavelength region, but a wider wavelength range can be covered by attaching suitable discrete photoelectric detectors. For example, as shown in FIG. 7, the near ultraviolet region can be covered by a silicon blue cell 50 while the near-infrared region can be covered by a PbS cell 52, which can be successively switched by a known multiplexer 54 according to the selected wavelength. In FIG. 7 there are also shown a prism 56 functioning as a diffracting element, and a signal processing circuit 58.

Figure 8:
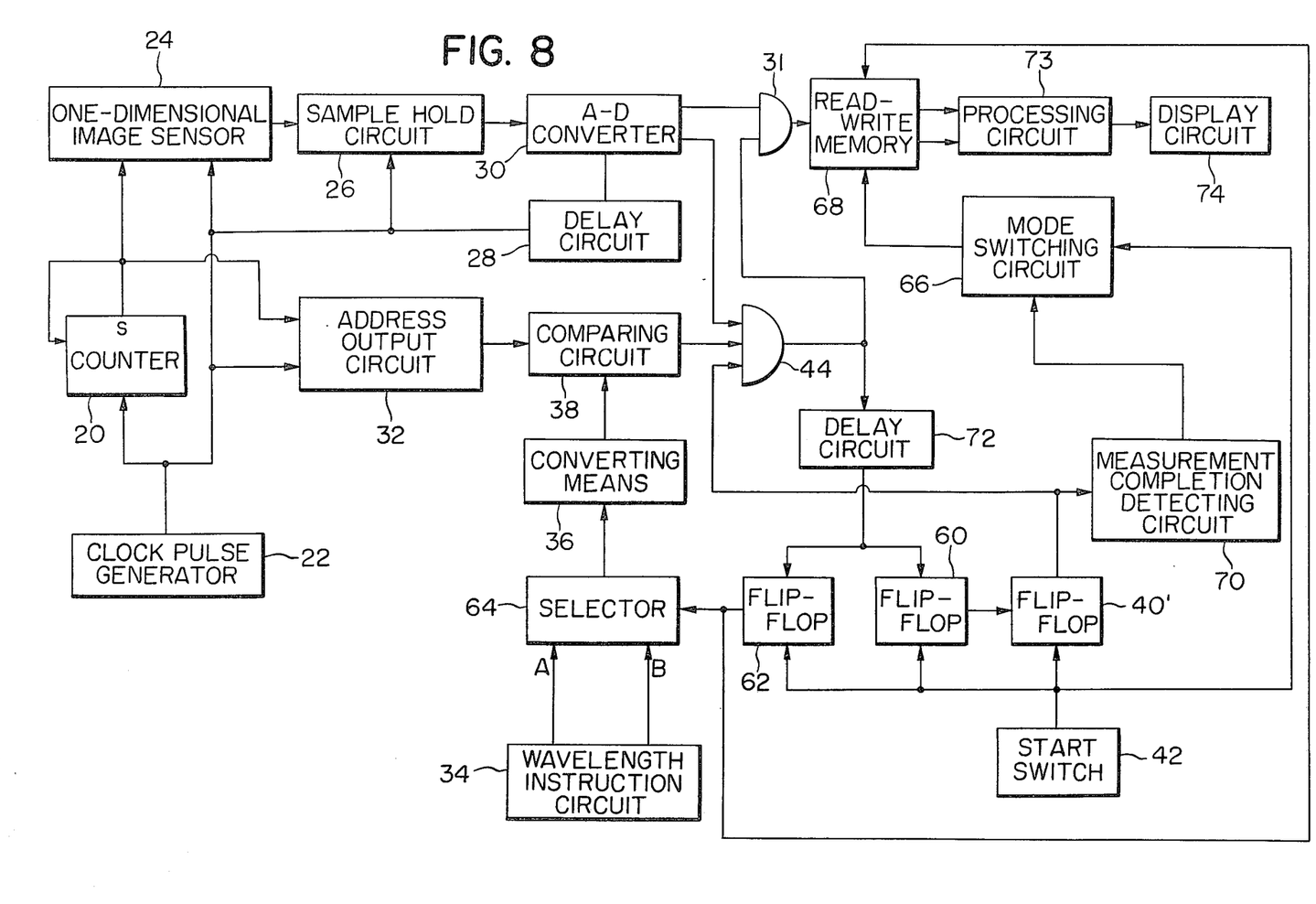
FIG. 8 is a block diagram of an electrical processing system of a spectrophotometer for measurement at two wavelengths embodying the present invention.

FIG. 8 shows still another embodiment wherein the present invention is applied to a spectrophotometer for conducting measurements at two wavelengths. Blocks which are the same as in FIG. 2 are numbered the same and are, therefore, omitted from the following explanation. Upon closing of the start switch 42, the flip-flop 40' is set while the counter (or flip-flop) 60, and the flip flop 62 are reset. The wavelength instruction switch circuit 34 is capable of selecting two wavelengths A and B. A selector 64 selects the wavelength A by the resetting of the flip-flop 62 and the wavelength B by the setting of said flip-flop 62, and the selected wavelengths are sent to a converting means 36. A mode switching circuit 66, which produces a signal for instructing the write-in or read-out of a read-write memory 68, generates a write-in signal upon closing of the start switch 42 and a read-out signal upon receipt of a measurement completion signal from a measurement completion detecting circuit 70. The memory circuit 68 identifies the wavelength selected by the selector 64 by the output signal of said flip-flop 62 when the mode switching circuit 66 produces the write-in signal, and selects and stores the outputs of the analog-digital converting circuit 30 passed through the AND gate 31 into different memory addresses.

FIG. 9 shows the details of said memory circuit 68, which is composed of a first AND gate 68a, corresponding to a first memory section 68c, and a second AND gate 68b, corresponding to a second memory section 68d. One input terminal of said AND gates is connected to the output terminal of an AND gate 45 while the other input terminal thereof is connected respectively to the inverted and uninverted output terminals of the flip-flop 62. A delay circuit 72 (FIG. 8) is provided to delay the logic "1" signal from the AND gate 44 by a predetermined time, and, in response to the delayed logic signal, the flip-flop 62 is set and the counter 60 is shifted from an initial state to the "1" state, whereby the selector 64 selects the wavelength B. After the data for the wavelength B is stored in a memory section of the memory circuit 68 different from the memory section utilized for storing the data of the wavelength A, the delay circuit 72 generates a logic "1" signal to advance the content of the counter 60 to "2", and an output is generated to reset the flip-flop 40'. Upon said resetting, the measurement completion detecting circuit 70 produces a measurement completion signal, in response to which the mode switching circuit 66 produces a read-out signal to supply the data for the wavelengths A and B from the memory circuit 68 to a processing circuit 73 for data processing and display on a display unit 74.

As explained in the foregoing, the present invention allows the selection of the photoelectric conversion signal corresponding to an arbitrarily selected wavelength from the signals time-sequentially produced from a one-dimensional image sensor by means of a simple structure.

What we claim is:

1. A spectrophotometer provided with a light diffracting element for obtaining diffracted light, comprising:
   image sensor means adapted for receiving said diffracted light and having a plurality of photoelectric converting elements for respectively receiving different wavelengths of said diffracted light and for producing corresponding photoelectrically converted signals, each photoelectric converting element having an address;
   drive means for sequentially scanning said photoelectric converting elements of said image sensor means in order to supply time-sequentially said photoelectrically converted signals;
   wavelength instructing means having selecting means enabling the arbitrary selection of a wavelength and being adapted to produce a wavelength signal corresponding to the address of a photoelectric converting element which receives the arbitrarily selected wavelength;
   address signal output means adapted to generate address signals corresponding to the addresses of the photoelectric converting elements of said image sensor means in synchronization with the scanning of said elements;
   coincidence signal output means adapted to compare said wavelength signal and said address signals and to produce a coincidence signal when said wavelength signal and an address signal coincide;
   circuit means including gate means responsive to said coincidence signal and adapted to receive the photoelectrically converted signals time-sequentially supplied from said image sensor means and to produce the photoelectrically converted signal corresponding to said selected wavelength in synchronization with said coincidence signal; and
   processing means for receiving the selected photoelectrically converted signal and adapted to suitably process the same.

2. A spectrophotometer according to claim 1, wherein said drive means for the image sensor means comprises:
   means for generating a start signal indicating the start of the scanning of said image sensor means; and
   a pulse generator for generating pulse signals for scanning the photoelectric converting elements of said image sensor means;
   and wherein said address signal output means is a counter adapted to be reset by said scanning start signal and to count the pulse signals supplied from said pulse generator.

3. A spectrophotometer according to claim 2, wherein said wavelength instructing means comprises a read-only memory which is adapted to provide the contents of an address thereof in response to the selection of said wavelength, said contents being a number to be counted by said counter corresponding to the address of the photoelectric converting element which receives said selected wavelength.

4. A spectrophotometer according to claim 1, wherein said circuit means comprises analog-digital converting means for analog to digital conversion of said photoelectrically converted signals from said image sensor means, and wherein said coincidence signal is utilized as a synchronizing signal for said converting means such that analog to digital conversion is performed only on the photoelectrically converted signal corresponding to said selected wavelength.

5. A spectrophotometer according to claim 4, wherein said analog-digital converting means comprises a sample and hold circuit, an analog-digital converting circuit for analog to digital conversion of the output of the sample and hold circuit, and a delay circuit, and wherein said coincidence signal is used as a sampling signal for said sample and hold circuit and is supplied to said analog-digital converting circuit as said synchronizing signal through said delay circuit.

6. A spectrophotometer according to claim 1, wherein said circuit means comprises:
   analog-digital converting means adapted to perform analog to digital conversions of the photoelectrically converted signals from said image sensor means and to produce conversion completion signals upon completion of said conversions;
   and wherein said gate means comprises a first AND gate adapted to generate a logic signal upon receipt of a conversion completion signal and said coincidence signal; and
   a second AND gate adapted to produce a digitally converted signal upon receipt of said logic signal from said first AND gate.

7. A spectrophotometer according to claim 6 wherein said coincidence signal output means produces said coincidence signal for a longer period of time than the time required for said analog-digital converting means to produce said conversion completion signal.

8. A spectrophotometer according to claim 1, wherein said processing means comprises:
   an adding circuit for adding the output signals from said circuit means;
   a counter for counting said coincidence signals;
   means for producing a closing signal for closing said gate means when said counter reaches a predetermined count; and
   a dividing circuit for dividing the added value obtained by said adding circuit by said predetermined count upon receipt of said closing signal.

9. A spectrophotometer according to claim 1, wherein said image sensor means comprises:
   a mono-chip photodiode array; and
   discrete photoelectric converting elements having spectral sensitivities not included in the spectral sensitivity range of said photodiode array.

10. A spectrophotometer according to claim 1, wherein said wavelength instructing means comprises:
    a wavelength storing section for temporarily storing selected plural wavelengths; and a converting circuit for converting a selected wavelength supplied from said wavelength storing section into a corresponding wavelength signal; and, wherein, said processing means comprises:

a data memory section for storing the photoelectrically converted signals from said circuit means separately for each selected wavelength; and control means for controlling said wavelength storing section and said data memory section in such a manner as to read the wavelengths from said wavelength storing section in succession and to store the output from said circuit means into a position in said data memory section corresponding to each wavelength.

* * * * *